(12) United States Patent
Dixon (10) Patent No.: US 9,826,680 B2
(45) Date of Patent: Nov. 28, 2017

(54) SIDE MOWER ATTACHMENT

(71) Applicant: Randy S. Dixon, Washington, NC (US)

(72) Inventor: Randy S. Dixon, Washington, NC (US)

(73) Assignee: RandCo Innovations, LLC, Washington, NC (US)

( * ) Notice: Subject to any disclaimer, the term of this patent is extended or adjusted under 35 U.S.C. 154(b) by 807 days.

(21) Appl. No.: 14/012,345

(22) Filed: Aug. 28, 2013

(65) Prior Publication Data
US 2014/0059991 A1    Mar. 6, 2014

Related U.S. Application Data

(60) Provisional application No. 61/695,030, filed on Aug. 30, 2012.

(51) Int. Cl.
*A01D 34/86* (2006.01)
*A01D 34/76* (2006.01)

(52) U.S. Cl.
CPC ............ *A01D 34/86* (2013.01); *A01D 34/76* (2013.01); *A01D 34/866* (2013.01)

(58) Field of Classification Search
CPC ...... A01D 34/283; A01D 34/63; A01D 34/84; A01D 34/86; A01D 34/866; A01D 34/64; A01D 34/76; A01D 33/14
USPC ............ 56/10.7, 11.6, 15.1, 15.2, 15.5, 15.7, 56/15.8, 15.9, 16.2
See application file for complete search history.

(56) References Cited

U.S. PATENT DOCUMENTS

| | | | | | |
|---|---|---|---|---|---|
| 2,502,805 | A | * | 4/1950 | Spurlin | A01D 34/07 280/450 |
| 2,566,144 | A | * | 8/1951 | Ross | A01D 34/246 56/10.9 |
| 2,696,704 | A | * | 12/1954 | Bjork | A01D 34/06 180/53.1 |
| 2,771,730 | A | * | 11/1956 | True | A01D 34/04 56/11.6 |
| 2,862,343 | A | * | 12/1958 | Wood | A01D 34/63 56/15.3 |
| 3,003,299 | A | * | 10/1961 | Smith | A01D 34/866 56/10.4 |
| 3,014,329 | A | * | 12/1961 | Cizek | A01D 34/63 56/11.6 |
| 3,053,033 | A | * | 9/1962 | Maguire | A01D 34/661 56/13.6 |
| 3,063,225 | A | * | 11/1962 | Barrentine | A01D 34/866 56/11.6 |
| 3,197,948 | A | * | 8/1965 | Danford | A01B 71/06 172/451 |
| 3,338,037 | A | * | 8/1967 | Bauer | A01D 34/42 241/154 |
| 3,483,683 | A | * | 12/1969 | McCanse | A01D 34/63 464/117 |
| 3,553,946 | A | * | 1/1971 | Taylor et al. | A01D 34/86 56/10.7 |

(Continued)

*Primary Examiner* — Thomas B Will
*Assistant Examiner* — Joan D Misa
(74) *Attorney, Agent, or Firm* — Ward and Smith, P.A.; Ryan K. Simmons (57) ABSTRACT

A hitch-mounted side mower attachment including an integral hydraulic system and adjustable angle mower deck for a tractor to facilitate mowing angled ground terrain, such as the side of hills, ditches, and/or other declining and/or inclining embankments not easily reached by conventional mowers.

28 Claims, 4 Drawing Sheets

(56) References Cited

U.S. PATENT DOCUMENTS

| | | | | |
|---|---|---|---|---|
| 3,715,872 A * | 2/1973 | Thompson, Jr. | A01D 34/863 | 56/10.4 |
| 3,729,910 A * | 5/1973 | Hardee | A01D 34/86 | 56/11.9 |
| 3,782,085 A * | 1/1974 | Parker | A01G 3/062 | 56/11.6 |
| 3,791,115 A * | 2/1974 | Nelsen | A01D 34/28 | 56/10.4 |
| 3,797,580 A * | 3/1974 | Roth | A01B 73/04 | 172/311 |
| 3,948,327 A * | 4/1976 | Parker | A01B 73/046 | 172/311 |
| 4,074,510 A * | 2/1978 | Teagle | A01D 34/435 | 56/12.7 |
| 4,104,851 A * | 8/1978 | Perry | A01D 34/866 | 369/63 |
| 4,495,754 A * | 1/1985 | Cartner | A01D 75/303 | 56/10.4 |
| 4,497,160 A * | 2/1985 | Mullet | A01D 75/30 | 56/11.6 |
| 4,512,416 A * | 4/1985 | Smith | A01B 73/044 | 172/311 |
| 4,518,043 A * | 5/1985 | Anderson | A01B 39/166 | 172/38 |
| 4,862,758 A * | 9/1989 | Magee | A01B 73/044 | 172/311 |
| 4,887,417 A * | 12/1989 | Parsons, Jr. | A01D 34/866 | 56/10.4 |
| 4,901,508 A * | 2/1990 | Whatley | A01D 34/863 | 56/10.4 |
| 4,912,916 A * | 4/1990 | Parsons, Jr. | A01D 34/866 | 56/15.2 |
| 5,040,360 A * | 8/1991 | Meehleder | A01D 43/16 | 56/11.6 |
| 5,050,372 A * | 9/1991 | Heiskell | A01B 33/06 | 56/12.7 |
| 5,167,108 A * | 12/1992 | Bird | A01D 43/16 | 56/10.4 |
| 5,203,150 A * | 4/1993 | Ryken | A01D 34/661 | 56/13.5 |
| 5,226,284 A * | 7/1993 | Meehleder | A01D 43/16 | 56/11.6 |
| 5,941,056 A * | 8/1999 | Lehman | A01D 34/661 | 56/11.6 |
| 6,334,292 B1 * | 1/2002 | Walch | A01D 34/76 | 56/10.2 R |
| 6,415,586 B1 * | 7/2002 | Park | A01D 34/64 | 56/12.1 |
| 6,474,053 B1 * | 11/2002 | Lund | A01D 43/16 | 56/12.7 |
| 7,347,037 B2 * | 3/2008 | Sundberg | A01D 34/001 | 56/14.9 |
| 7,690,177 B2 * | 4/2010 | Spitzley | A01D 34/84 | 56/14.9 |
| 7,963,734 B2 * | 6/2011 | Bruha | A01D 87/122 | 414/24.5 |
| 8,302,372 B1 * | 11/2012 | Eubanks | A01D 43/16 | 56/12.7 |
| 2005/0193700 A1 * | 9/2005 | Bares | A01D 34/82 | 56/12.7 |
| 2006/0288681 A1 * | 12/2006 | Kuzub | A01D 34/86 | 56/14.9 |

\* cited by examiner

SIDE MOWER ATTACHMENT

RELATED APPLICATIONS

This application is related and claims priority to U.S. Patent Application No. 61/695,030, filed on Aug. 30, 2012, entitled "Side Mower Attachment", the entire disclosure of which is incorporated herein by reference.

FIELD OF THE INVENTION

The present invention is generally related to a side mower attachment. Specifically, the present invention relates to a hitch-mounted side mower attachment for a lawn mower/tractor to facilitate mowing angled ground terrain, such as the side of hills, ditches, and/or other declining and/or inclining embankments not easily reached by conventional mowers.

BACKGROUND

Conventional lawn mowers are well-known and used on a daily basis by lawn maintenance companies, landscapers, and individuals with a yard or field that requires mowing. Traditional towed lawn mowers have a mower attachment attached to the back of a tractor or other vehicle. These towed lawn mowers typically receive the power required for rotating their blades from the tractor's engine. An auxiliary drive train from the tractor is connected to the towed mower's drive shaft, utilizing the tractors power-take-off (PTO) output shaft, to provide a rotational force for turning of the blade, or blades. The mower is then towed behind the tractor and the grass or brush can be cut wherever the tractor can go. The problem with these traditional towed mowers is that mowing is limited to generally flat areas and other stable areas where the tractor can safely operate. Traditional towed mowers cannot mow severely declining areas such as the banks of a ditch, nor can they cut severely inclining areas such as the sides of a steep hill or embankment.

It is, thus, desirable to provide a mower attachment for a tractor that allows the mower attachment to extend to the side of the tractor so that the tractor can travel along side of an area to be mowed, and further, to have a mowing deck that can be adjustable to angle up or down so that inclining and declining areas, relative to the path of the tractor, can be efficiently mowed.

SUMMARY OF THE INVENTION

In one embodiment the invention provides a side mower attachment device. The side mower attachment may include a main frame; a support arm attached at a proximal end to the main frame, the support arm having one or more sections; a main drive pulley attached to the main frame and operatively connected to a rotational power source; a transfer pulley attached to a section of the support arm at a distance from the main drive pulley, wherein the main drive pulley is configured to drive the transfer pulley via a first belt; a mower deck attached to a distal end of the support arm, having a blade drive pulley attached thereto, wherein the blade drive pulley is driven by the transfer pulley via a second belt, and the blade drive pulley is configured to rotate one or more blades operatively attached to an underside of the mower deck; and an integral hydraulic system, comprising a hydraulic cylinder connected to the support arm and operatively connected to the mower deck, wherein the hydraulic system is configured to adjust an angle of the mower deck.

The side mower attachment may further include a hydraulic pump operatively connected to the hydraulic cylinder. The side mower attachment may be configured to mount to a compact or sub-compact tractor. The mower deck angle may be adjustable in the range of from about 90 degrees above horizontal to about 90 degrees below horizontal. The rotational power source may be a power take off (PTO) shaft, e.g., from a tractor. The integral hydraulic system may be configured to connect to an existing remote or auxiliary hydraulic output system of a tractor. The support arm may have a reach in the range of about five (5) feet to about ten (10) feet extending from a side of a mower. The main frame may include angled upright portions and a tower cross portion connected in substantially a triangle configuration. The angled upright portions and a tower cross portion may include one of rectangular, square, or round steel tubing. The main frame may further include a hydraulic fluid reservoir. A portion of the main frame may form the hydraulic fluid reservoir. The main frame may be configured as a 3-point hitch frame. The hydraulic pump may be mounted to the main frame. The hydraulic cylinder may include a dual direction hydraulic cylinder. The hydraulic pump may include a pump drive shaft and a pump pulley wheel attached to the pump drive shaft, wherein the hydraulic pump may be driven by a pump belt engaged with the pump pulley wheel and a drive shaft pulley, wherein the drive shaft pulley may be operatively connected to the rotational power source, and wherein the pump belt may be driven by the drive shaft pulley to operate the hydraulic pump. The support arm my include one of rectangular, square, or round steel tubing. The one or more sections of the support arm may include a slide-frame arm adjustably connected thereto, wherein the slide-frame arm may be configured to be adjustable relative to the support arm to facilitate tensioning of the first belt. The side mower attachment may further include at least one of a first belt tensioner and second belt tensioner. The one or more sections of the support arm may include a mower deck swing-arm connected to the slide-frame arm. The side mower attachment may further include a mower deck slide-frame connected to the mower deck, wherein the mower deck slide-frame may be adjustably connected to the mower deck swing-arm to facilitate tensioning of the second belt. The side mower attachment may further include one or more belt guards, configured to provide a protective shield for one or more of the first and second belts and associated main drive, drive shaft, transfer, and blade drive pulleys. The side mower attachment may further include a counter weight mounted on substantially an opposite end of the support arm from that of the mower deck. The counter weight may be adjustable with respect to its weight and/or position. The transfer pulley may include a dual transfer pulley mounted at a pivot point between the slide-frame arm and the mower deck swing-arm, wherein the main drive pulley may be operatively engaged with one of the dual pulleys of the dual transfer pulley via the first belt, and wherein the dual transfer pulley may be configured to transfer power from the first pulley to the blade drive pulley via the second belt, which may be operatively engaged with the other of the dual pulleys of the dual transfer pulley, to rotate the one or more blades of the mower deck. The pivot point may include a pivot shaft for enabling the pivot point to pivot and for mounting of the dual transfer pulley. The side mower attachment may further include a lift linkage connected to a hydraulic cylinder rod of the hydraulic cylinder configured to facilitate raising and/or lowering of the angle of the mower deck. The lift linkage may include a 4-point lifting shackle. The lift linkage may be further operatively attached at its proximal end to the slide-frame arm and at its distal end to the mower deck swing arm. The lift linkage may be configured to be activated by extension and retraction of the hydraulic cylinder rod. The hydraulic cylinder may be attached at its proximal end to the slide-frame arm and the hydraulic cylinder rod may be operatively attached to the lift linkage. Extending the hydraulic cylinder rod preferably causes the mower deck to angle downward and retracting the hydraulic cylinder rod causes the mower deck to angle upward. The side mower attachment may further include a hydraulic control valve configured to control the movement of the hydraulic cylinder. The hydraulic control valve may include a plurality of hydraulic hose inlets and outlets. The hydraulic control valve may be connected to the hydraulic pump by a valve supply hose configured for supplying hydraulic fluid conveyed from the hydraulic pump to the hydraulic control valve, wherein hydraulic fluid may be initially drawn from a hydraulic fluid reservoir by the hydraulic pump via a pump supply hose, and wherein the hydraulic control valve may be further connected to the hydraulic cylinder via a first hydraulic cylinder hose and a second hydraulic cylinder hose configured to provide hydraulic fluid to and from the hydraulic cylinder for extending and/or retracting a hydraulic cylinder rod of the hydraulic cylinder. The hydraulic control valve may be further connected to the hydraulic fluid reservoir by a reservoir return hose configured for conveying hydraulic fluid returned from the hydraulic cylinder to the hydraulic fluid reservoir. The hydraulic control valve may further include a remote control unit operatively connected to the hydraulic control valve via a control cable.

DESCRIPTION

In accordance with one embodiment of the invention, a hitch-mounted tractor side mower attachment for mowing angled ground terrain, such as hill and ditch embankments not easily reached by conventional mowers is provided.

Figure 1:
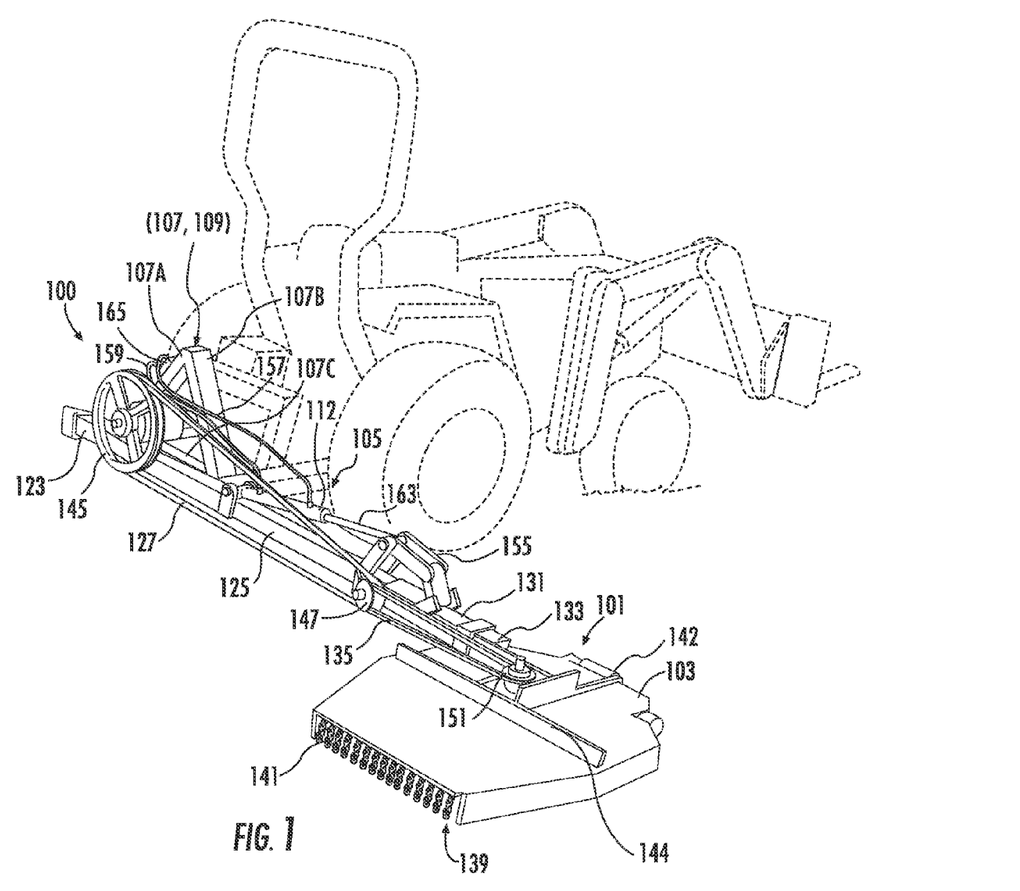
FIG. 1 illustrates a perspective view of a side mower attachment in accordance with an embodiment of the present invention.
Figure 2:
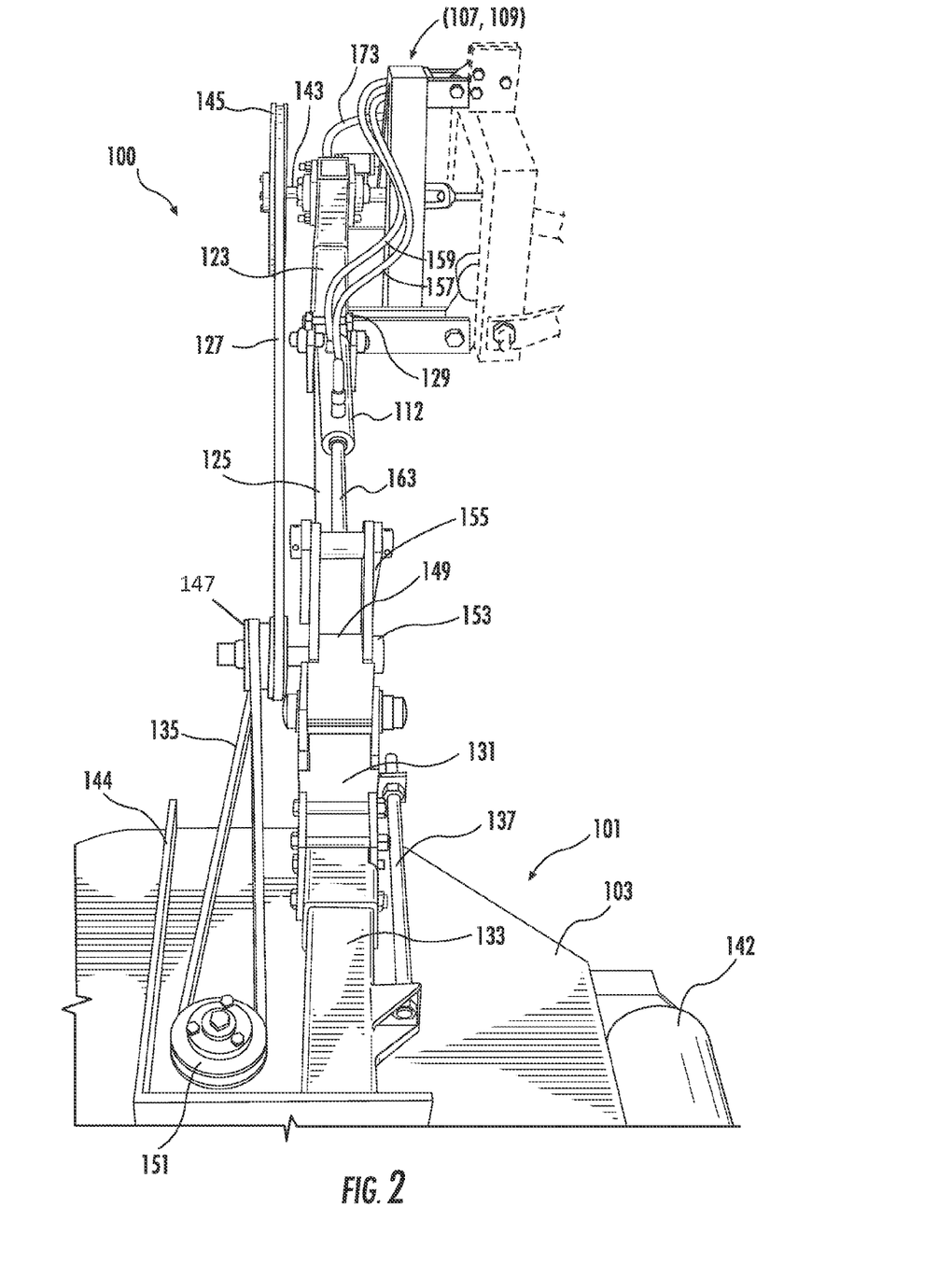
FIG. 2 illustrates a top perspective view of a side mower attachment in accordance with an embodiment of the present invention.
Figure 3:
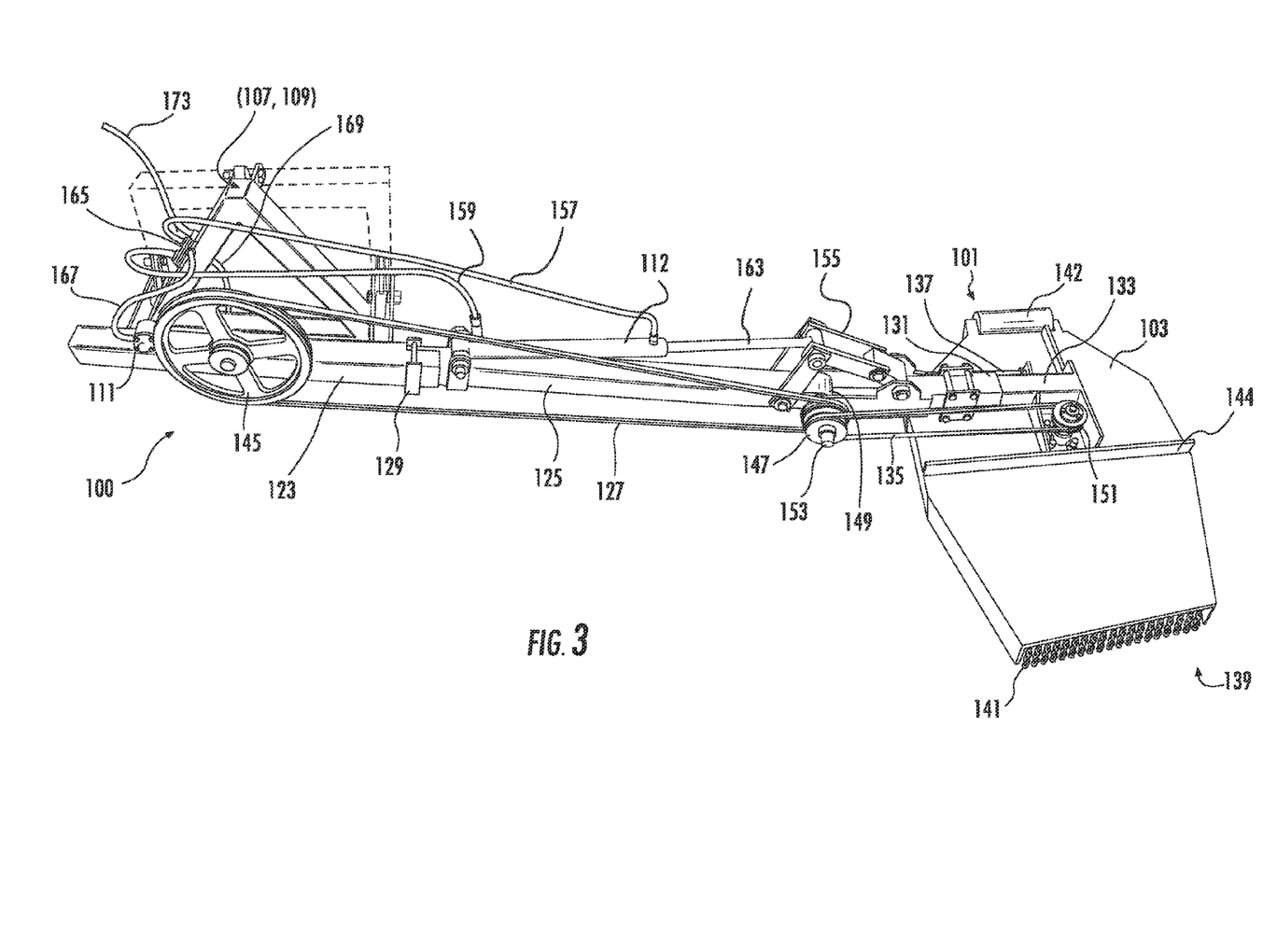
FIG. 3 illustrates a side perspective view of a side mower attachment in accordance with an embodiment of the present invention.
Figure 4:
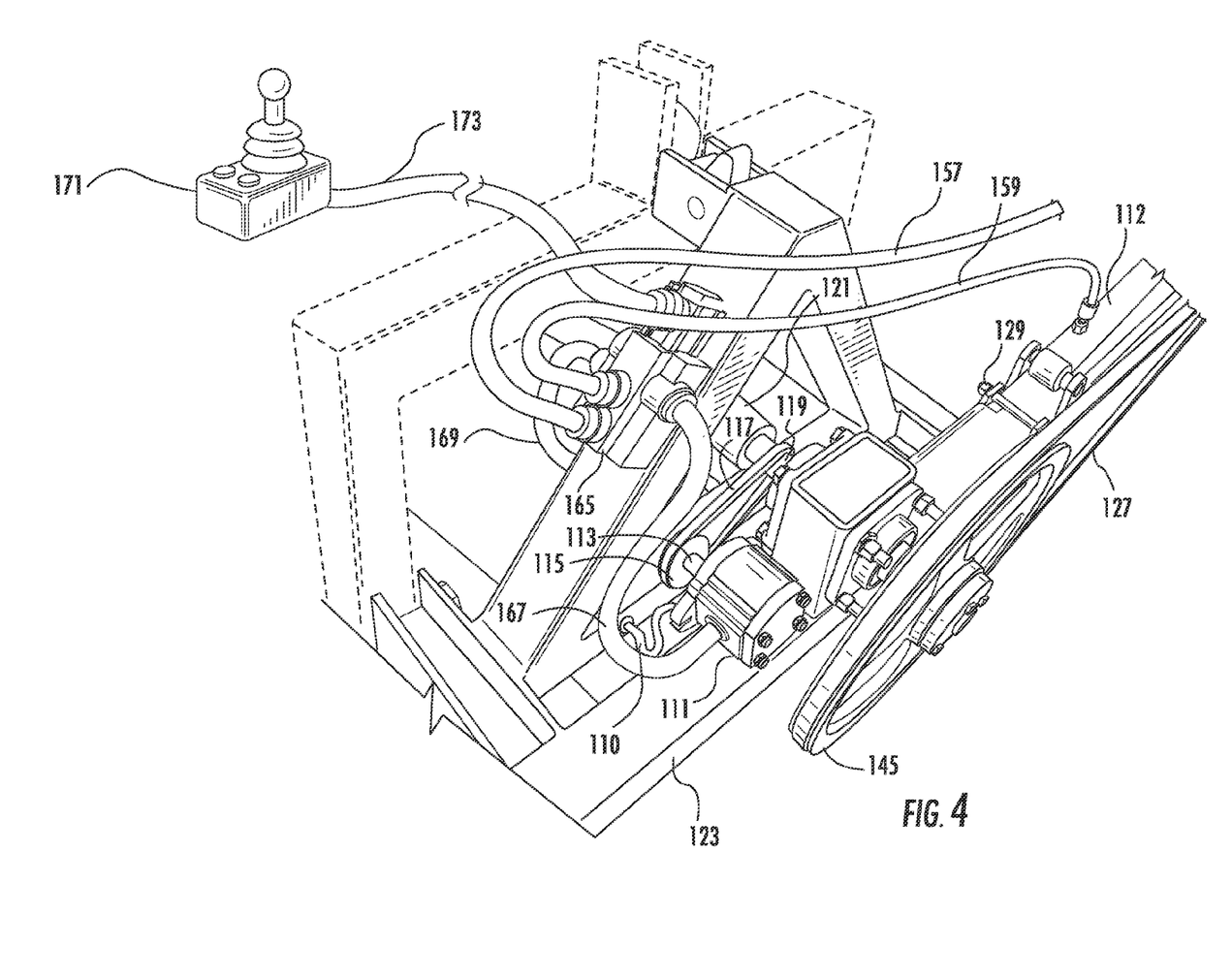
FIG. 4 illustrates a rear perspective view of a side mower attachment in accordance with an embodiment of the present invention.

The side mower attachment is further described in more detail with reference to FIGS. 1-4. In one embodiment, the invention provides a side mower attachment 100 for lawn tractors, such as compact and sub-compact tractors, for example compact and sub-compact tractors in the range of about 20 horsepower to about 50 horsepower. Side mower attachment 100 may include a power take off (PTO) and belt driven cutting head 101. The cutting head 101 preferably includes a mower deck 103. The cutting head 101 is preferably capable of being pivoted, e.g., hydraulically, to enable mower deck 103 to assume various angled positions, for example in the range of from about 90 degrees from horizontal to about 90 degrees below horizontal. Side mower attachment 100 may also work on larger tractors or other vehicle or equipment having a PTO, or like mechanism. Side mower attachment 100 may further be used with tractors with or without an existing auxiliary hydraulic system.

Side mower 100 preferably utilizes the PTO output shaft of a tractor to drive side mower 100, which is preferably a belt-driven mower consisting of one or more rotating blades with an integral hydraulic system 105 for adjusting the angle of mower deck 103. The hydraulic system 105 preferably allows for adjusting the angle of mower deck 103 for mowing on various angled surfaces, for example, in the range of from about 90-degrees from horizontal to about 90-degrees below horizontal. In one embodiment side mower 100 may be constructed without the integral hydraulic system 105, in such an embodiment side mower 100 would utilize A remote or auxiliary hydraulic output system (not shown) present on the tractor.

In one embodiment side mower 100 has a reach in the range of about 5 feet to about 10 feet extending from a side of the tractor, and a mower deck 103 with a cutting capacity in the range of about 25 inches to about 40 inches.

Side mower 100 preferably includes a main frame 107, which may, for example, be constructed of round or rectangular tubular steel. Main frame 107 preferably includes angled upright tubes 107A and 107B and a lower cross tube 107C. Angled upright tubes 107A and 107B may, for example, be constructed of rectangular, square, or round steel tubing, and may in a non-limiting example, have dimensions in the range of about 2½×3½×0.1875 inches. Lower cross tube 107C may, for example, be constructed of rectangular, square, or round steel tubing, and may in a non-limiting example, have dimensions in the range of about 3½×3½×0.125 inches. Angled upright tubes 107A and 107B, in conjunction with the lower cross tube 107C, preferably, in addition to providing main frame 107, also may function as a reservoir 109 for the integral hydraulic system 105. Main frame 107 is preferably configured to mount to a tractor. In one example, main frame 107 may be configured as a 3-point hitch frame to mount to a standard tractor hitch.

A hydraulic pump 111 is preferably mounted in proximity to main frame 107, for example hydraulic pump 111, may be mounted to a side of main frame 107. Hydraulic pump 111 is preferably configured for operating a hydraulic cylinder 112, such as dual direction hydraulic cylinder. Hydraulic pump 111 may be any conventional hydraulic pump suitable for operating hydraulic cylinder 112. Hydraulic pump 111 preferably includes a pump drive shaft 113 and a pump pulley wheel 115 attached to pump drive shaft 113. Hydraulic pump 111 is preferably driven by a pump belt 117. Pump belt 117, for example, may be a conventional A-series belt. Pump belt 117 is preferably engaged with pump pulley wheel 115 and a drive shaft pulley 119 on main drive shaft 121, wherein belt 117 is driven by the drive shaft pulley 119 to operate hydraulic pump 112. Hydraulic pump 111 is preferably connected with reservoir 109 via a pump supply hose 110.

Side mower 100 further preferably includes a main-frame arm 123. Main-frame arm 123 may be constructed of rectangular, square, or round steel tubing, and may in a non-limiting example, have dimensions in the range of about 3½×3½×0.1875 inches.

Side mower 100 further preferably includes a slide-frame arm 125. Slide-frame arm 125 may be constructed of rectangular, square, or round steel tubing, and may, in a non-limiting example, have dimensions in the range of about 3×3×0.1875 inches. Slide-frame arm 125 preferably is preferably configured for a portion thereof to slide inside of the main-frame arm 123 in order to allow for tensioning of a main drive belt 127. Slide-frame arm 125 preferably includes a main belt tensioner 129 for tensioning of the main drive belt 127. In one, example main belt tensioner 129 is substantially the same as blade belt tensioner 137.

Side mower 100 further preferably includes a mower deck swing-arm 131. Mower deck swing arm 131 may be constructed of rectangular, square, or round steel tubing, and may in a non-limiting example, have dimensions in the range of about 3½×3½×0.1875 inches.

Side mower 100 further preferably includes a mower deck slide-frame 133 attached to the mower deck 103. Mower deck slide-frame 133 may be constructed of rectangular, square, or round steel tubing, and may, in a non-limiting example, have dimensions in the range of about 3×3×0.1875 inches. Mower deck slide-frame 133 is preferably configured for a portion thereof to slide inside of mower deck swing-arm 131 in order to facilitate tensioning of a blade belt 135 via blade belt tensioner 137. In one example, blade belt tensioner 137 may be configured as an adjustment screw.

Side mower 100 may also include belt guards (not shown), configured in a protective fashion covering main drive belt 127 and blade belt 135 to shield the belts and their associated pulleys from debris and/or to prevent injury to a user while side mower 100 is in use.

Mower deck 103 may be constructed of a formed steel plate. In one example, mower deck 103 may be constructed of steel in the range of about 10 to about 12-gauge steel. Mower deck 103 may include a unitary steel top plate with a number of sides extending downward encasing a perimeter of mower deck 103, except for a rear edge 139 of mower deck 103. The rear edge of the mower deck 103 is preferably open to allow for the escape of cut grass, and in one embodiment may include deflector chains 141 for deflection of vegetation debris as it is discharged from rear edge 139 of mower deck 103. Mower deck 103, may include an anti-scarf roller 142 mounted on a front side of the mower deck 103. Mower deck 103 may further include one or more reinforcement channels and/or one or more formed flanges 144 for reinforcement of the mower deck 103.

Side mower 100 may optionally include a counter weight box (not shown) mounted on a side opposite of the mower deck 103 for increased stability. The counter weight box may be slideably mounted on a slide-tube for easy retraction during transport or storage.

The main drive-shaft 121 preferably engages the PTO output shaft (not shown) on the tractor and engages a main pulley shaft 143. Main pulley shaft 143 may be constructed of a solid steel shaft in the range of about 1⅜" diameter. A main drive pulley 145 is preferably mounted to the main pulley shaft 143 and is driven by the PTO output shaft of the tractor through main pulley shaft 143.

Side mower 100 may further include a dual transfer pulley 147 mounted at a pivot point 149 between the slide-frame arm 125 and mower deck swing-arm 131. Main drive pulley 145 is operatively engaged with one of the dual pulleys of dual transfer pulley 147 via main drive belt 127. Dual transfer pulley 147 transfers power from main drive pulley 145 to a blade drive pulley 151 via blade drive belt 135 to rotate one or more blade(s) (not shown) of mower deck 103. Blade drive belt 135 is operatively engaged with the other of the dual pulleys of dual transfer pulley 147 and blade drive pulley 151. Blade drive belt 135 may, for example, be a conventional B-series belt.

Pivot point 149 may include a pivot shaft 153 for enabling pivot point 149 to pivot and for mounting of the dual transfer pulley 147. Pivot shaft 153 may be constructed of a solid steel shaft in the range of about 1" diameter.

Blade drive pulley 151 is preferably mounted on the top of a rotating shaft (not shown) and configured for rotating the one or more blades (not shown) operatively attached thereto under mower deck 103.

Side mower 100 may further include a lift linkage 155, which, in one example, may be embodied as a 4-point lifting shackle, operatively connected to a hydraulic cylinder rod 163 of the hydraulic cylinder 112 to facilitate the raising and/or lowering of the angle of the mower deck 103. Lift linkage 155 is preferably operatively attached at its proximal end to the slide-frame arm 125 and at its distal end to the mower deck swing arm 131. The lift linkage 155 is activated by the extension and retraction of the hydraulic cylinder rod 163. The lift linkage 155 preferably includes a floating arm design to allow the mower deck 103 to rise up when encountering obstruction to prevent damage to the mower deck 103.

Hydraulic cylinder 112 is preferably attached at its proximal end to slide-frame arm 125 and hydraulic cylinder rod 163 is operatively attached to lift linkage 155. Hydraulic cylinder 112 further includes a first hydraulic cylinder hose 157 and a second hydraulic cylinder hose 159 attached thereto for conveying hydraulic fluid to/away from hydraulic cylinder 112 to cause hydraulic cylinder rod 163 to extend and/or retract. Lift linkage 155 is configured and connected to slide-frame arm 125 and mower deck swing arm 131, such that extending hydraulic cylinder rod 163 causes mower deck swing arm 131 to pivot downward about the pivot shaft 153 at pivot point 149, thus causing mower deck 103 to angle downward, and likewise, by retracting hydraulic cylinder rod 163 causes mower deck swing arm 131 to pivot upward about the pivot shaft 153 at pivot point 149, thus causing mower deck 103 to angle upward.

Side mower 100 preferably further includes a hydraulic control valve 165. Hydraulic control valve 165 may, in one example, be mounted to main frame 107, for example, to one of angled upright tubes 107A or 107B. Hydraulic control valve 165 is configured to control the movement of hydraulic cylinder 112. Hydraulic control valve 165 preferably includes a number of hydraulic hose inlets and outlets. Hydraulic control valve 165 is preferably connected to hydraulic pump 111 by a valve supply hose 167 for supplying hydraulic fluid conveyed from hydraulic pump 111 to hydraulic control valve 165. Hydraulic fluid is initially drawn from reservoir 109 by hydraulic pump 111 via pump supply hose 110. Hydraulic control valve 165 is further preferably connected to hydraulic cylinder 120 via first hydraulic cylinder hose 157 and second hydraulic cylinder hose 159 to provide hydraulic fluid to and from hydraulic cylinder 120, thus extending/retracting hydraulic cylinder rod 163. Hydraulic control valve 165 is further preferably connected to reservoir 109 by a reservoir return hose 169 for conveying hydraulic fluid returned from hydraulic cylinder 112 to reservoir 109. Hydraulic control valve 165 may further include a remote control unit 171 operatively connected to the hydraulic control valve 165 via a control cable 173. A user may control the hydraulic control valve 165, thus hydraulic cylinder 112, remotely via remote control unit 171.

In operation, in one example, as hydraulic fluid is conveyed by hydraulic pump 111 to hydraulic control valve 165 and then directed to hydraulic cylinder 112 via second hydraulic cylinder hose 159, the hydraulic fluid pressure in the hydraulic cylinder 112 causes hydraulic cylinder rod 163 to extend. As hydraulic cylinder rod 163 extends, hydraulic fluid present in the hydraulic cylinder 112 is forced out via, first hydraulic cylinder hose 157 and conveyed to hydraulic control valve 165, where the returned hydraulic fluid is conveyed to reservoir 109 by hydraulic control valve 165. To retract hydraulic cylinder rod 163 hydraulic fluid is conveyed by hydraulic pump 111 to hydraulic control valve 165 and then directed to hydraulic cylinder 112 via first hydraulic cylinder hose 157, the hydraulic fluid pressure in the hydraulic cylinder 112 causes hydraulic cylinder rod 163 to retract. As hydraulic cylinder rod 163 retracts, hydraulic fluid present in the hydraulic cylinder 112 is forced out via second hydraulic cylinder hose 159 and conveyed to hydraulic control valve 165, where the returned hydraulic fluid is conveyed to reservoir 109 by hydraulic control valve 165.

As the hydraulic cylinder rod 163 is retracted, hydraulic cylinder rod 163 cause lift linkage 155 to be pulled in a backwards direction, thus causing mower deck swing arm 131 moveably connected thereto to pivot upwards about pivot shaft 153 of pivot point 149. As mower deck swing arm 131 pivots upward mower deck 103, attached thereto, is angled upward. Likewise, as the hydraulic cylinder rod 163 is extended, hydraulic cylinder rod 163 cause lift linkage 155 to be pushed in a forward direction, thus causing mower deck swing arm. 131 moveably connected thereto, to pivot downwards about pivot shaft 153 of pivot point 149. As mower deck swing arm 131 pivots downward mower deck 103, attached thereto, is angled downward.

CONCLUDING REMARKS

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, parameters, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments ±100% in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

The foregoing detailed description of embodiments refers to the accompanying drawings, which illustrate specific embodiments of the invention. Other embodiments having different structures and operations do not depart from the scope of the present invention. The term "the invention" or the like is used with reference to certain specific examples of the many alternative aspects or embodiments of the applicant's invention set forth in this specification, and neither its use nor its absence is intended to limit the scope of the applicant's invention or the scope of the claims. This specification is divided into sections for the convenience of the reader only. Headings should not be construed as limiting of the scope of the invention. The definitions are intended as a part of the description of the invention will be understood that various details of the present invention may be changed without departing from the scope of the present invention. Furthermore, the foregoing description is for the purpose of illustration only, and not for the purpose of limitation, as the present invention is defined by the claims as set forth hereinafter.

What is claimed is:

1. A side mower attachment device, comprising:
   a. a main frame;
   b. a support arm attached at a proximal end to the main frame, the support arm having sections, comprising: a slide-frame arm adjustably connected to the support arm; and a mower deck swing-arm connected to the slide-frame arm, wherein the slide-frame arm is configured to be adjustable relative to the support arm to facilitate tensioning of a first belt;
   c. a main drive pulley attached to the main frame and operatively connected to a rotational power source;
   d. a transfer pulley attached to a section of the support arm at a distance from the main drive pulley, wherein the main drive pulley is configured to drive the transfer pulley via the first belt;
   e. a mower deck attached to a distal end of the support arm, having a blade drive pulley attached thereto, wherein the blade drive pulley is driven by the transfer pulley via a second belt, and the blade drive pulley is configured to rotate one or more blades operatively attached to an underside of the mower deck;
   f. an integral hydraulic system, comprising a hydraulic cylinder connected to the support arm and operatively connected to the mower deck, wherein the hydraulic system is configured to adjust an angle of the mower deck;
   g. a mower deck slide-frame connected to the mower deck, wherein the mower deck slide-frame is adjustably connected to the mower deck swing-arm in a linear arrangement to facilitate tensioning of the second belt; and h. a lift linkage, the lift linkage having a plurality of linkage sections comprising: a first linkage section connected at its proximal end to the slide-frame arm and at its distal end to a hydraulic cylinder rod; a second linkage section connected at its proximal end to the hydraulic cylinder rod and the distal end of the first linkage section; a third linkage section connected at its proximal end to a distal end of the second linkage section and at its distal end to the mower deck swing arm, wherein the third linkage section comprises a floating arm linkage portion configured to allow the mower deck to freely rise and fall in response to the terrain over which it travels.

2. The side mower attachment of claim 1 further comprising a hydraulic pump operatively connected to the hydraulic cylinder.

3. The side mower attachment of claim 2 wherein the hydraulic pump is mounted to the main frame.

4. The side mower attachment of claim 2 wherein the hydraulic pump includes a pump drive shaft and a pump pulley wheel attached to the pump drive shaft, wherein the hydraulic pump is driven by a pump belt engaged with the pump pulley wheel and a drive shaft pulley, wherein the drive shaft pulley is operatively connected to the rotational power source, and wherein the pump belt is driven by the drive shaft pulley to operate the hydraulic pump.

5. The side mower attachment of claim 2 further comprising a hydraulic control valve configured to control the movement of the hydraulic cylinder.

6. The side mower attachment of claim 5 wherein the hydraulic control valve comprises a plurality of hydraulic hose inlets and outlets.

7. The side mower attachment of claim 5 wherein the hydraulic control valve is connected to the hydraulic pump by a valve supply hose configured for supplying hydraulic fluid conveyed from the hydraulic pump to the hydraulic control valve, wherein hydraulic fluid is initially drawn from a hydraulic fluid reservoir by the hydraulic pump via a pump supply hose, and wherein the hydraulic control valve is further connected to the hydraulic cylinder via a first hydraulic cylinder hose and a second hydraulic cylinder hose configured to provide hydraulic fluid to and from the hydraulic cylinder for extending and/or retracting a hydraulic cylinder rod of the hydraulic cylinder.

8. The side mower attachment of claim 7 wherein the hydraulic control valve is further connected to the hydraulic fluid reservoir by a reservoir return hose configured for conveying hydraulic fluid returned from the hydraulic cylinder to the hydraulic fluid reservoir.

9. The side mower attachment of claim 5 wherein the hydraulic control valve further comprises a remote control unit operatively connected to the hydraulic control valve via a control cable.

10. The side mower attachment of claim 1 wherein the side mower attachment is configured to mount to a compact or sub-compact tractor.

11. The side mower attachment of claim 1 wherein the mower deck angle is adjustable in the range of from about 90 degrees above horizontal to about 90 degrees below horizontal.

12. The side mower attachment of claim 1 wherein the rotational power source comprises a power take off (PTO) shaft.

13. The side mower attachment of claim 1 wherein the integral hydraulic system is configured to connect to an existing remote or auxiliary hydraulic output system of a tractor.

14. The side mower attachment of claim 1 wherein the support arm has a reach in the range of about five (5) feet to about ten (10) feet extending from a side of a tractor to which it is attached.

15. The side mower attachment of claim 1 wherein the main frame comprises angled upright portions and a lower cross portion connected in substantially a triangle configuration.

16. The side mower attachment of claim 15 wherein the angled upright portions and the lower cross portion comprise one of rectangular, square, or round steel tubing.

17. The side mower attachment of claim 1 wherein the main frame further comprises a hydraulic fluid reservoir.

18. The side mower attachment of claim 17 wherein a portion of the main frame forms the hydraulic fluid reservoir.

19. The side mower attachment of claim 1 wherein the main frame is configured as a 3-point hitch frame.

20. The side mower attachment of claim 1 wherein the hydraulic cylinder comprises a dual direction hydraulic cylinder.

21. The side mower attachment of claim 1 wherein the support arm comprises one of rectangular, square, or round steel tubing.

22. The side mower attachment of claim 1 further comprising at least one of a first belt tensioner and second belt tensioner.

23. The side mower attachment of claim 1 wherein the transfer pulley comprising a dual transfer pulley mounted at a pivot point between the slide-frame arm and the mower deck swing-arm, wherein the main drive pulley is operatively engaged with one of the dual pulleys of the dual transfer pulley via the first belt, and wherein the dual transfer pulley is configured to transfer power from the first pulley to the blade drive pulley via the second belt, which is operatively engaged with the other of the dual pulleys of the dual transfer pulley, to rotate the one or more blades of the mower deck.

24. The side mower attachment of claim 23 wherein the pivot point comprises a pivot shaft for enabling the pivot point to pivot and for mounting of the dual transfer pulley.

25. The side mower attachment of claim 1 wherein the lift linkage is connected to the hydraulic cylinder rod of the hydraulic cylinder configured to facilitate raising and/or lowering of the angle of the mower deck.

26. The side mower attachment of claim 25 wherein the lift linkage is configured to be activated by extension and retraction of the hydraulic cylinder rod.

27. The side mower attachment of claim 25 wherein the hydraulic cylinder is attached at its proximal end to the slide-frame arm and the hydraulic cylinder rod is operatively attached to the lift linkage.

28. The side mower attachment of claim 25 wherein extending the hydraulic cylinder rod causes the mower deck to angle downward and retracting the hydraulic cylinder rod causes the mower deck to angle upward.

* * * * *